July 20, 1937. L. SAUSSARD 2,087,817
UNIVERSAL JOINT
Filed Dec. 24, 1935 4 Sheets-Sheet 1

L. Saussard
INVENTOR
By: Glascock Downing & Seebold
Attys.

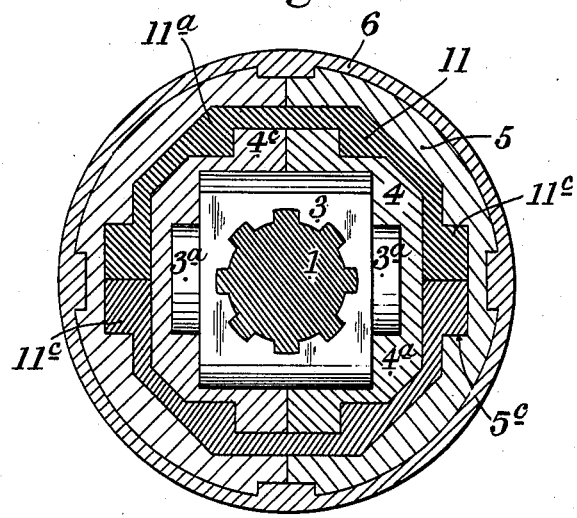
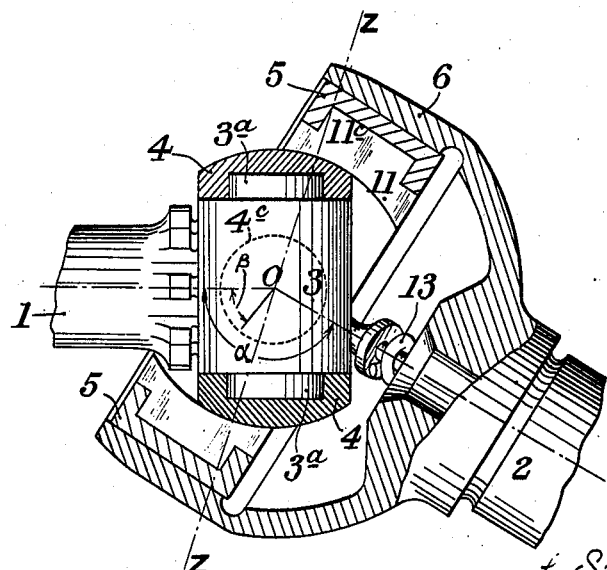

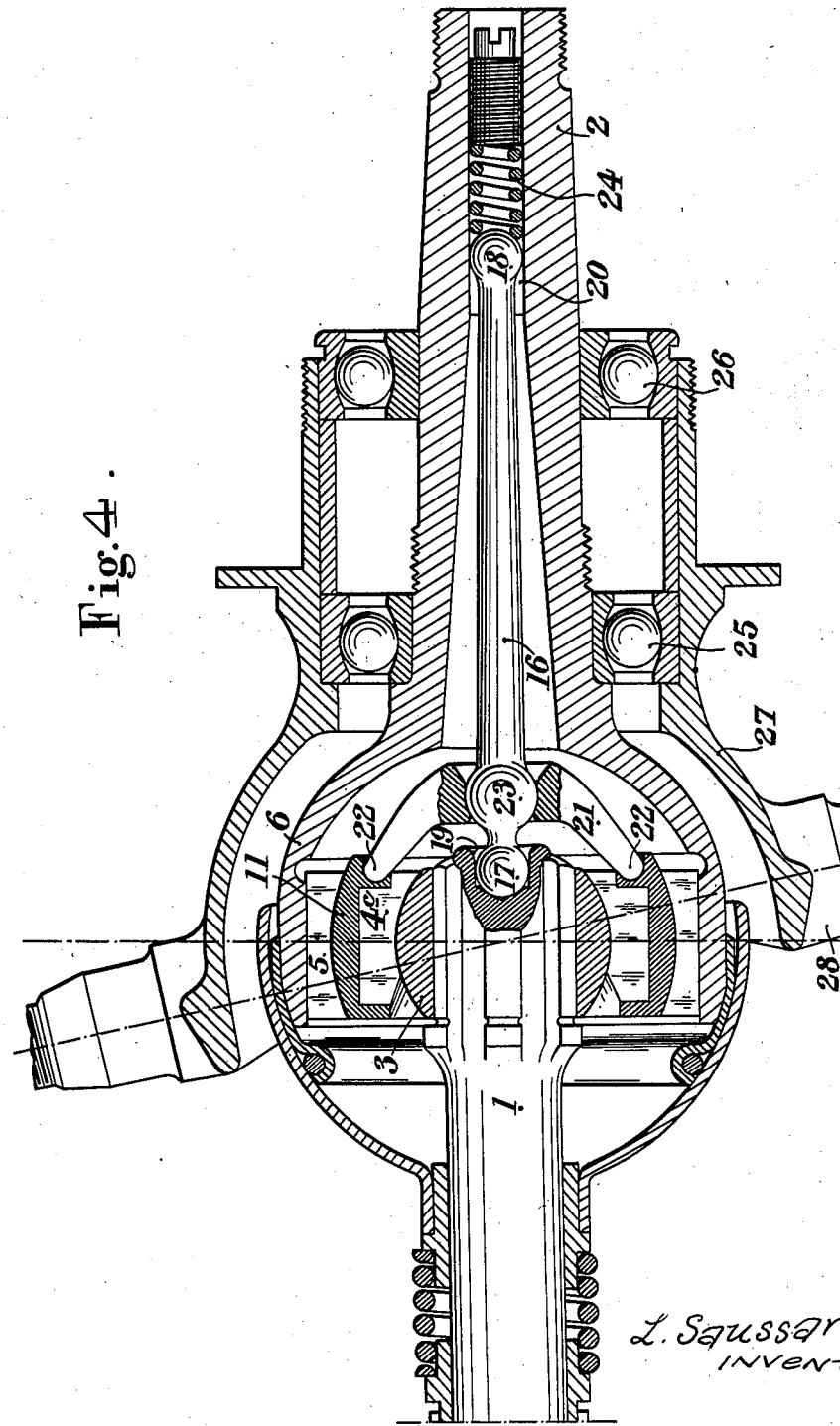

Patented July 20, 1937

2,087,817

UNITED STATES PATENT OFFICE 2,087,817

UNIVERSAL JOINT

Louis Saussard, Paris, France

Application December 24, 1935, Serial No. 56,100
In France December 24, 1934

3 Claims. (Cl. 64—21)

This invention relates to a universal joint or apparatus serving to couple two shafts forming together a more or less important angle.

This apparatus comprises a block secured or keyed on one of the shafts, an annular body secured or keyed on the other shaft and two intermediate rings coupled to said block and to said annular body by journals or pivot pins the axes of which are at right angles to those of the respective shafts and arranged as in Cardan joints so as to allow the transmission of the rotation from one of the shafts to the other shaft, even when these shafts, instead of being in alignment, form any angle.

An object of the invention is to provide a joint of this kind the elements of which bear one on the other through wide surfaces of revolution in order to be subjected only to small unitary pressures and, consequently, to little wear and to constitute a durable joint and which does not work loose upon use.

Another object of the invention is to give to the elements of such a joint a conformation allowing to easily machine them and to fit or assemble them without using screws, bolts or other members capable of becoming loose or of producing accidental damages within the apparatus.

A further object of the invention is to devise a joint of this kind which is homokinetic whilst comprising only members which are simple, few in number and of rugged construction, these members being assembled in a very compact form. The arrangements provided for obtaining these results will be described with reference to the accompanying drawings illustrating, by way of example, two forms of construction of the universal joint according to the invention.

Fig. 2 is a cross section made according to line VIII—VIII of Fig. 1.

Fig. 3 is a longitudinal section of the same apparatus, the shafts forming an angle α and having rotated to the extent of 90° about their respective axes.

Fig. 4 is a horizontal section of the second form of construction, also comprising two intermediate rings, the shafts being in alignment.

Figure 1:
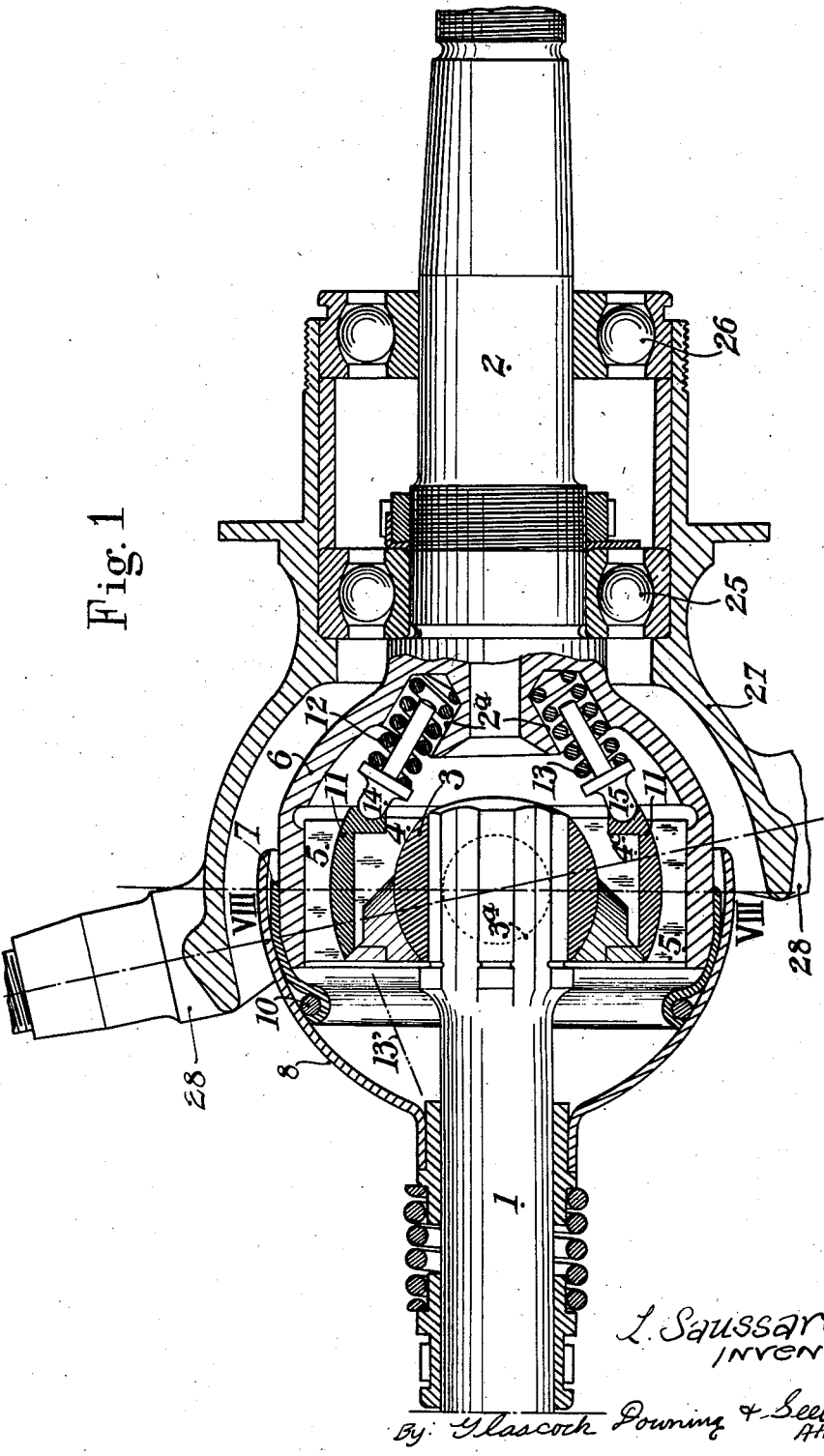
Fig. 1 is a longitudinal section of the first form of construction, which comprises two intermediate rings.

In Figs. 1 to 3, the shafts to be coupled are designated by reference numbers 1 and 2; the shaft 1 carries a small wheel 3 provided with two journals 3a, and about which is arranged a first ring 4 the cavities 4a of which fit over the journals or pivot pins 3a; on this ring are moreover provided journals or pivot pins 4c on which fit the cavities 11a of a second ring 11; the latter is provided in its turn with journals or pivot pins 11c fitted into cavities 5c of an outer annular body 5 which is secured in a drum 6 carried by shaft 2. The axes of the journals or pivot pins 3a and 11c are at right angles to the shafts 1 and 2, respectively; they are moreover at right angles to the axis of the pivot pins or journals 4c and all these axes converge towards one and the same point 0.

The small wheel 3, rings 4 and 11, and body 5 are fitted with slight friction one in the other according to cylindrical and conical surfaces of revolution concentric with the respective pivot pins, so that the whole constitutes a compact unit of extremely rugged construction. In fact, if the cross section of the joint (Fig. 2) is considered, it will be seen that the forces of rotation or torques can be transmitted from block 3 to ring 4, from this ring 4 to the ring 11, and from this ring 11 to the body 5, by the entire meridian periphery of said blocks and rings, even by the plane ends of their journals, since their meridian profiles do not present portions concentric with the center 0.

The rings 4, 11 and body 5 are each divided into two parts in order to facilitate the manufacture and assemblage.

The whole is sheltered from dust and water by a cover made in two parts 7 and 8, secured on drum 6 and on shaft 1, respectively, and rubbing on each other through spherical surfaces with a fluid-tight packing 10.

A joint thus constructed allows shafts 1 and 2 to rotate at a uniform speed whatever may be the angle formed by these shafts, because the axis passing through the journals or pivot pins 4c can always constantly remain in the bisecting plane of said angle.

However, if the joint only comprised the members above mentioned, the action of the driving and resistant torques on shafts 1 and 2, would have for effect, at certain moments, to cause rings 4 and 11 to rock, by compelling the axis of the journals or pivot pins 4c to incline relatively to the bisecting plane of the angle above mentioned, so that the speed of rotation of shaft 2 would no longer be constantly equal to that of shaft 1, but sometimes delayed, and sometimes accelerated during each revolution.

This rocking movement can particularly take place about the axis of the journals or pivot pins 3a and 11c, when the latter are directed at right angles to the plane of the non-aligned shafts. In fact let us consider the apparatus at rest at a moment when the shafts 1, 2 form a horizontal angle α and when axes of the journals or pivot pins 3a and 11c are on the vertical passing through the center of the joint; the rings 4 and 11 are then both vertical and the common plane of the journals or pivot pins 3a, 11c, 4e can be indifferently set about said vertical. Let us assume that this plane forms an acute angle β with the driving shaft 1, that shaft 2 is stationary, and that shaft 1 is subjected to a driving torque. This torque produces on the journals or pivot pins 3a horizontal thrusts orthogonal to shaft 1 and tending to cause the entire set of rings 4 and 11 to pivot about this shaft; but the resistant torque prevents the rotation of the rings 4, 11 in their own plane, whilst nothing prevents their rotation about the vertical axis 3a, 11c; it results therefrom that these rings suddenly pivot about said vertical axis in the direction of the reduction of the angle β, until they are stopped by abutting against shaft 1. At this moment, they have transmitted to the journals 11c and, consequently, to shaft 2, only a very small angular displacement.

From this moment, the entire set of rings is rigidly driven and transmits the rotation of shaft 1 to shaft 2, but in unsatisfactory conditions since the journals 4c are not situated in the bisecting plane of shafts 1, 2. These unsatisfactory conditions subsequently persist because the force of inertia to rotation alone tends to move the rings towards this bisecting plane, and that in the case of a motor vehicle wheel the speed of rotation is practically insufficient for producing this righting effect in opposition to the thrust which presses the rings against the driving shaft 1.

According to the present invention, the axis of pivot pins 4c is prevented from being completely free to thus incline, for instance by causing two springs 12 and 13 to act on ring 11, as illustrated in Fig. 1, these springs 12 and 13 bearing, on the one hand, on shaft 2, in cavities 2a of the latter, and, on the other hand, on ring 11, through the medium of rods 14, 15 provided with a spherical member and fitted into cavities of this ring in the vicinity of pivot pins 4c.

These two springs, of equal strength, always urge ring 11 to remain at right angles to the plane of shaft 2; but, when shafts 1, 2 form an angle α (Fig. 3) and rotate, the springs 12 and 13 resiliently yield and allow the axis of pivot pins 4c to oscillate about the pivot pins 11c, so that these pivot pins 4c can remain in the bisecting planes of the shafts as they are urged to do so by their connections with both shafts as long as the latter rotate at one and the same speed. This equality of speed usually tends to be maintained during a complete revolution, owing to the inertia of the movable bodies or masses connected to the driving and driven shafts. The joint then operates as a homokinetic joint without the rings 4 and 11 being capable of loosely rocking in any of their positions.

Instead of arranging both springs 12 and 13 symmetrically to shaft 2, they can be symmetrically arranged relatively to the bisecting plane of the angle formed by the non-aligned shafts 1 and 2, the spring 12 remaining placed as indicated in Fig. 1, and spring 13 being placed according to the direction indicated at 13', between a bearing member rigid with shaft 2 and a point of ring 4 symmetrical to the bearing point of spring 12. In these conditions, the axis of pivot pins 4c will constantly be urged by these springs, as well as by the influence of the inertia of the uniformly moving masses or bodies connected to the shafts, to continuously remain in said bisecting plane.

Figure 5:
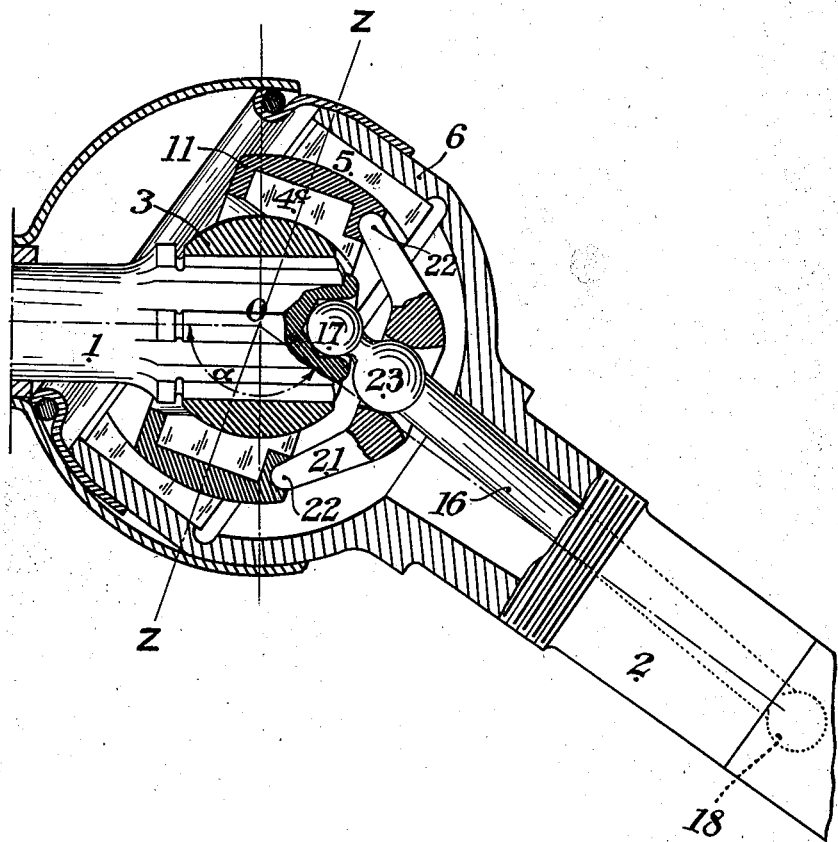
Fig. 5 is a horizontal section of the same form of construction, the shafts forming an angle α.

Finally, Figs. 4 and 5 show a solution in which the blocks 3, rings 4, 11 and bodies 5, 6 are substantially similar to those of the first form of construction, and the journals or pivot pins 4c are guided by rigid members: the latter consist, on the one hand, in a rod 16, the ends of which, in the form of spherical members 17 and 18, are fitted with slight friction into cylindrical cavities 19 and 20 provided in the ends of shafts 1 and 2 and, on the other hand, in a cross bar 21, of V-shape, the ends of which, in the form of spherical members 22, rest in cavities provided in ring 11 opposite the pins 4c, whilst the middle portion of this cross bar, perforated and recessed so as to constitute a spherical seat, bears on a spherical member 23 located at a suitably chosen point of rod 16.

A spring 24, arranged in the bottom of cavity 20, constantly pushes the rod 16, so as to ensure the contact of the spherical member 23 on the cross bar 21.

It will be seen that, when shafts 1 and 2 form a variable angle α, the middle portion of the cross bar 21, therefore the center of the spherical member, described an arc of circle concentric with point 0 where converge the axes of both shafts and of the three pairs of journals or pivot pins 3a, 4c, 11c, whilst the center of the spherical member 17 slides according to the axis of shaft 1 and the center of the spherical member 18 slides according to the axis of shaft 2.

The spherical member 23 is placed, relatively to spherical members 17 and 18, in such a manner that for a definite angle α, for instance 30°, the center of this spherical member 23 is located on the outer bisecting line of said angle.

In this position, the cross bar 21 therefore holds pins 4c symmetrically relatively to this bisecting line, so that, during the rotation of shafts 1 and 2, these pivot pins 4c cannot move away from the bisecting plane Z Z; the homokinetic transmission is thus rigidly obtained.

It is easy to verify that for all the angles α comprised between the above mentioned value and the angle zero (shafts in alignment) the center of the spherical member 23 practically remains on the bisecting line of the angle formed by the axes of the shafts, so that the axes of pins 4c are still held in the required bisecting plane by the cross bar 21 passing on this spherical member.

In the example illustrated in Figs. 4 and 5, the shaft 2 is a stub axle of a front wheel of a motor car and is supported by means of ball bearings 25 and 26 in a box 27 rigid with a steering element 28 of the usual construction, and 1 is the control shaft of the front wheels.

This mechanical solution which is advantageous owing to its simplicity and compactness, is given by way of example only, and the invention includes the use of any other rigid or resilient guide means allowing to hold the journals or pivot pins 4c. It also includes the application of the guide means above described to all kinds of joints having three converging pivot pins whatever may be the particular shapes and arrangements of the members pivoted on these pivot pins and on the shafts to be coupled. The springs 12, 13, 13' mentioned above can be replaced by resilient members of any shape and made of any material, for instance of rubber.

I claim:

1. A universal joint comprising the combination of a block adapted to be secured on one of the shafts to be coupled and having two opposed pivot pins and surfaces of revolution about the axis of these pivot pins, an intermediate ring the inner wall of which is fitted with slight friction on the pivot pins and surfaces of revolution of said block and the periphery of which also presents two opposed pivot pins and surfaces of revolution about the axis of these latter pivot pins, which axis is at right angles to that of the journals of said block, a second intermediate ring surrounding the preceding one and having its inner wall fitted with slight friction on the latter pivot pins and surfaces of revolution of the said first intermediate ring, this second ring also having on its periphery two opposed pivot pins and surfaces of revolution about the axis of these pivot pins, which axis is at right angles to the axis of the pivot pins of the first intermediate ring, an outer ring the inner wall of which is fitted with slight friction on said second intermediate ring, and means for securing the said outer ring on the second one of the shafts to be coupled, said surfaces of revolution of said block and of said rings being so shaped as to be capable of transmitting the forces of rotation by their entire meridian periphery.

2. A universal joint as claimed in claim 1 in combination with means for holding the axis of the pivot pins connecting the two intermediate rings one to the other according to the bisecting plane of the angle of the two shafts to be coupled, these means comprising a rigid rod, means for guiding the ends of this rod respectively according to the axes of the shafts to be coupled, and a transverse rigid element the middle portion of which is pivoted, through a spherical member, on an intermediate point of said rod, and the ends of which are pivoted, through spherical members, on one of said intermediate rings at points adjacent to the said axis of the pivot pins.

3. A universal joint as claimed in claim 1 in combination with means for holding the axis of the pivot pins connecting the two intermediate rings one to the other according to the bisecting plane of the angle of the two shafts to be coupled, these means comprising springs each of which is connected, at one of its ends, to one of said intermediate rings at a point adjacent to the axis of the pivot pins connecting this ring to the other intermediate ring, and is connected, at its opposite end, to a point integral with one of the shafts to be coupled.

LOUIS SAUSSARD.